US011463583B1

(12) United States Patent
Manzanillo

(10) Patent No.: US 11,463,583 B1
(45) Date of Patent: Oct. 4, 2022

(54) DEVICE COMMUNICATION WITH PUBLIC SAFETY ANSWERING POINT

(71) Applicant: Intrado Corporation, Omaha, NE (US)

(72) Inventor: Mario Manzanillo, Dollard-des-Ormeaux (CA)

(73) Assignee: INTRADO CORPORATION, Omaha, NE (US)

( * ) Notice: Subject to any disclaimer, the term of this patent is extended or adjusted under 35 U.S.C. 154(b) by 78 days.

(21) Appl. No.: 16/921,816

(22) Filed: Jul. 6, 2020

(51) Int. Cl.
*H04M 3/51* (2006.01)
*H04W 4/029* (2018.01)
*H04W 4/90* (2018.01)

(52) U.S. Cl.
CPC ....... *H04M 3/5116* (2013.01); *H04M 3/5141* (2013.01); *H04W 4/029* (2018.02); *H04W 4/90* (2018.02)

(58) Field of Classification Search
None
See application file for complete search history.

(56) References Cited

U.S. PATENT DOCUMENTS

| | | | |
|---|---|---|---|
| 10,856,136 B1 * | 12/2020 | Espy | H04B 17/318 |
| 2017/0289350 A1 * | 10/2017 | Philbin | G08B 25/016 |
| 2019/0020992 A1 * | 1/2019 | Romano | H04W 4/90 |
| 2019/0125264 A1 * | 5/2019 | Abreu Oramas | A61B 5/165 |

* cited by examiner

*Primary Examiner* — Harry S Hong

(57) ABSTRACT

An example operation may include one or more of receiving data and metadata from a device, detecting that an event has been captured within the device data and a geographic location of the device based on the metadata, converting information about the detected event and the geographic location into a telephone communication of the device, and transmitting the telephone communication of the device, via a telephone network, to a telephone number of a call station.

16 Claims, 10 Drawing Sheets

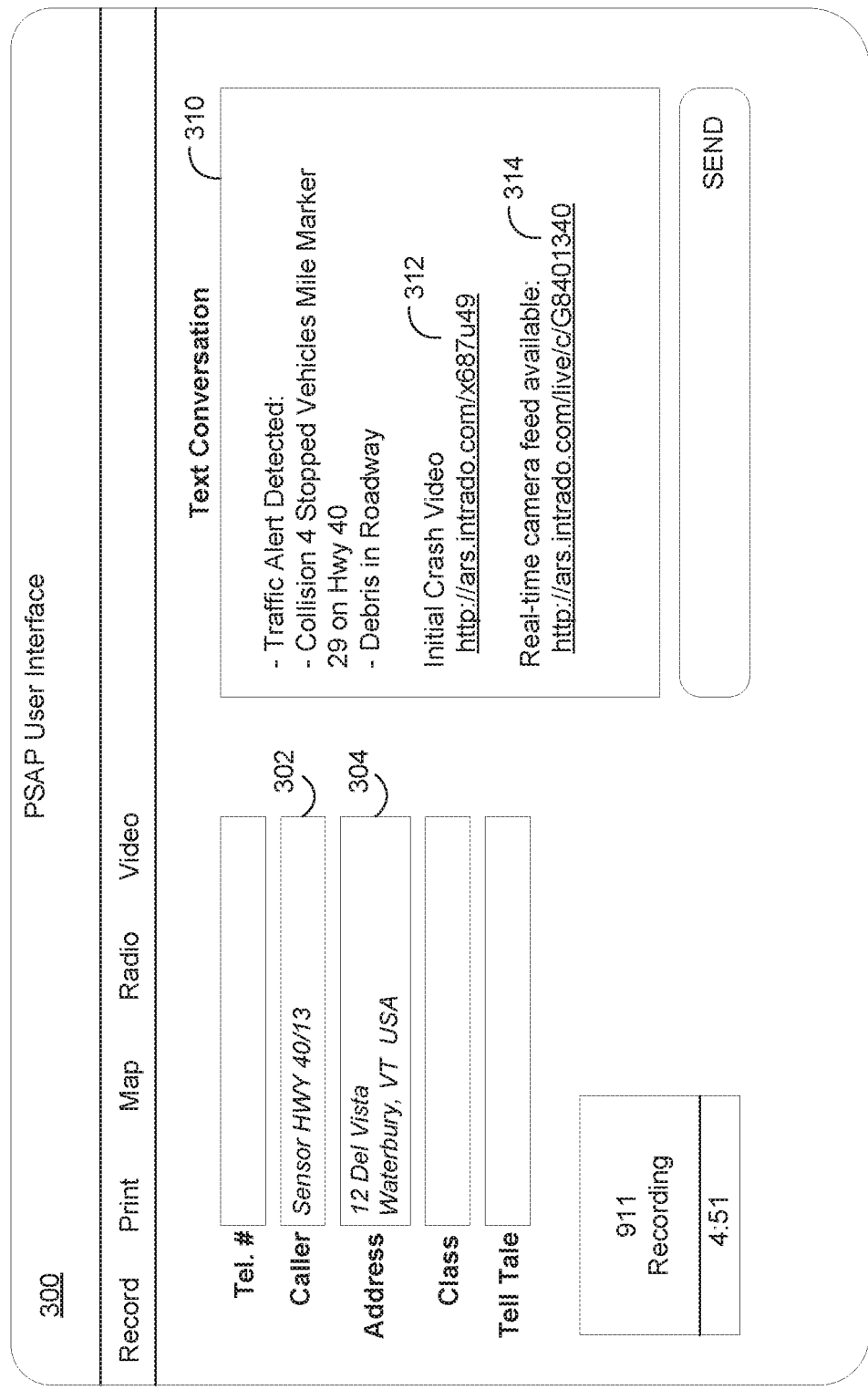

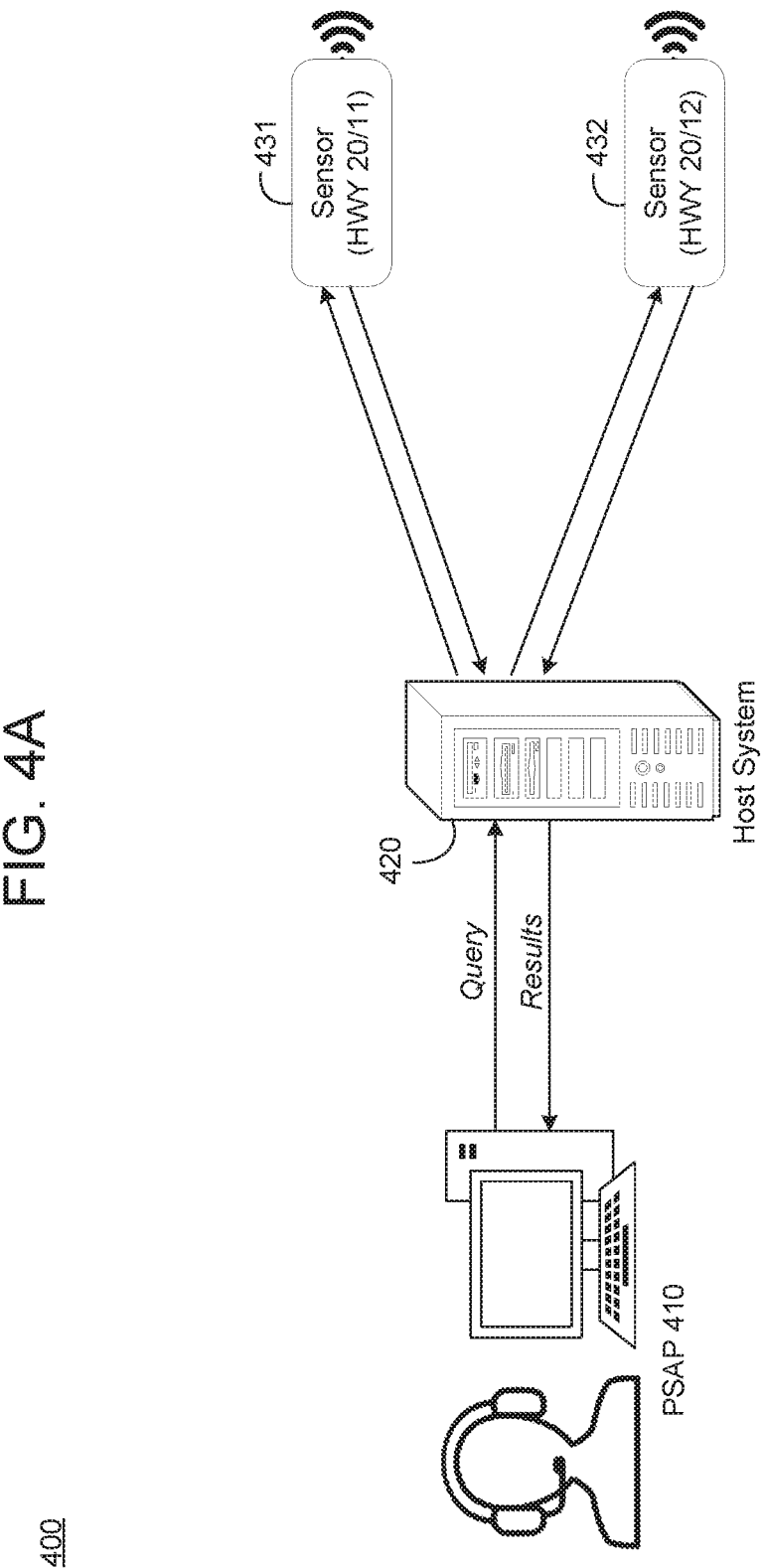

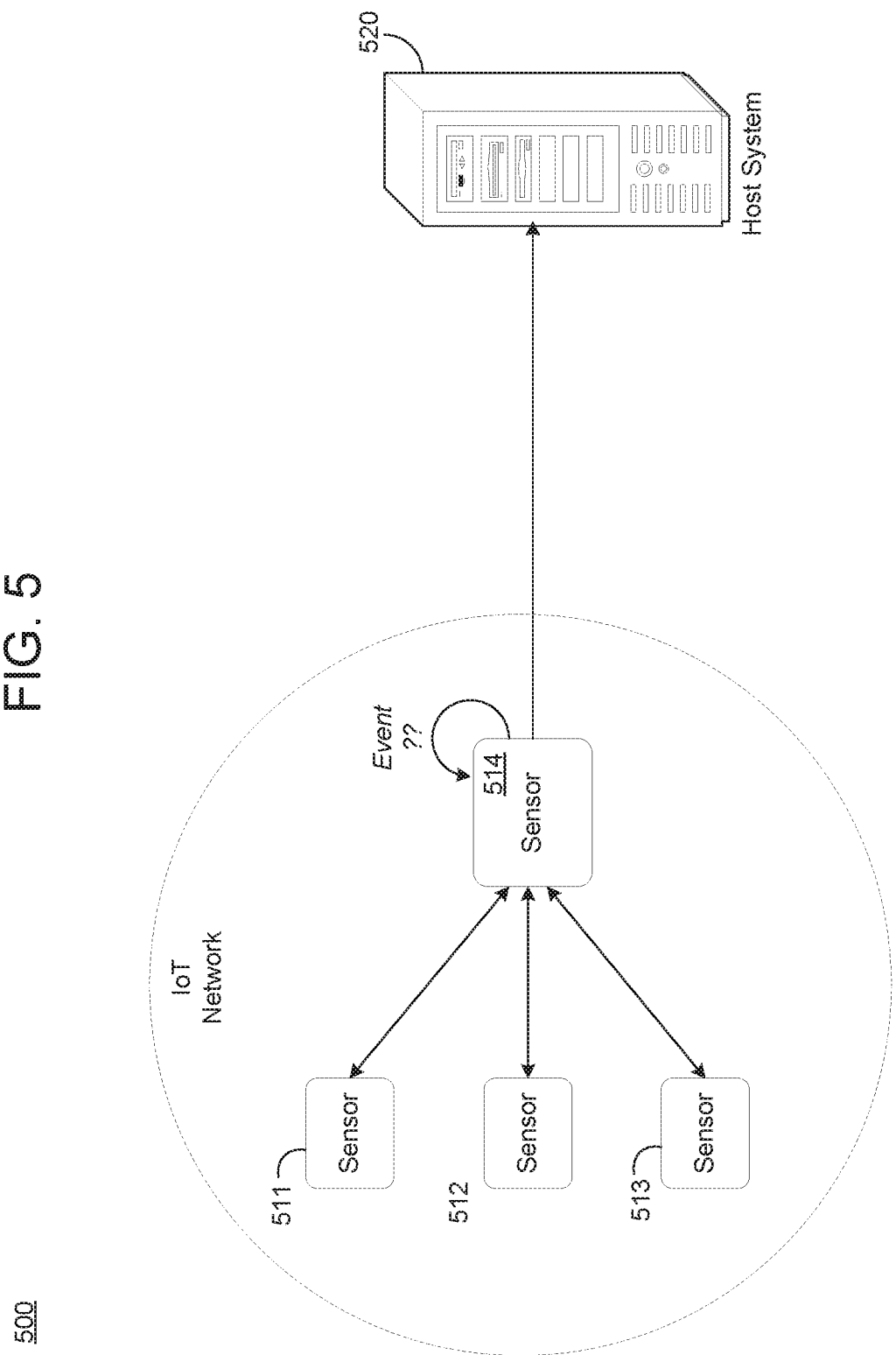

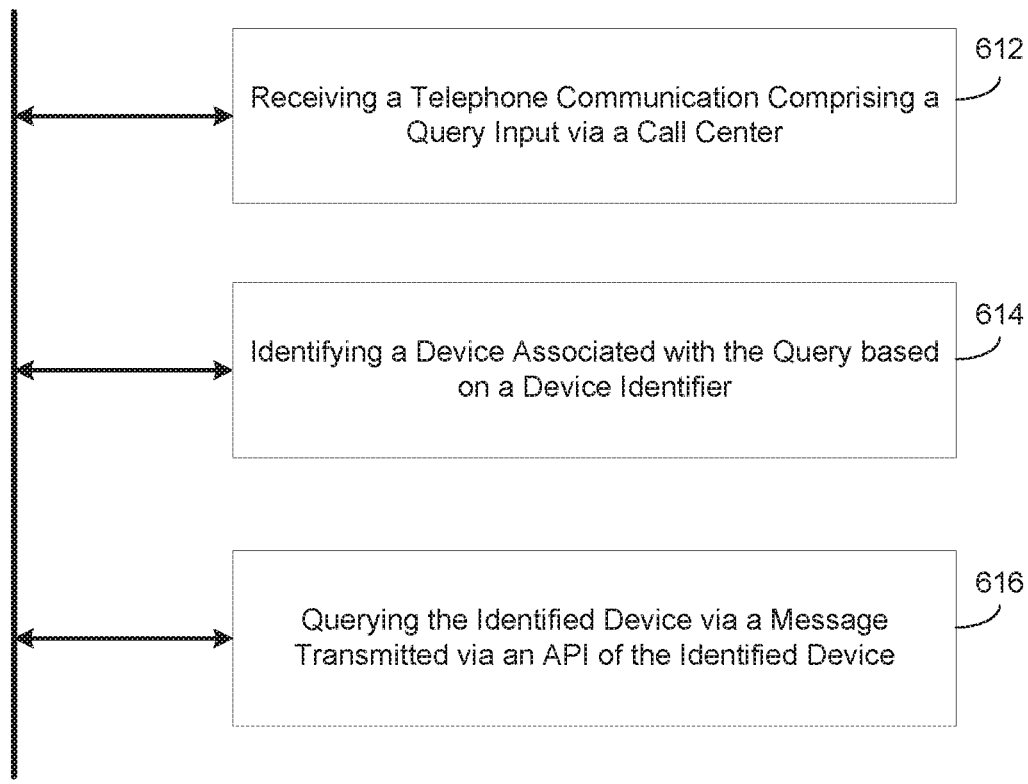

700  FIG. 7
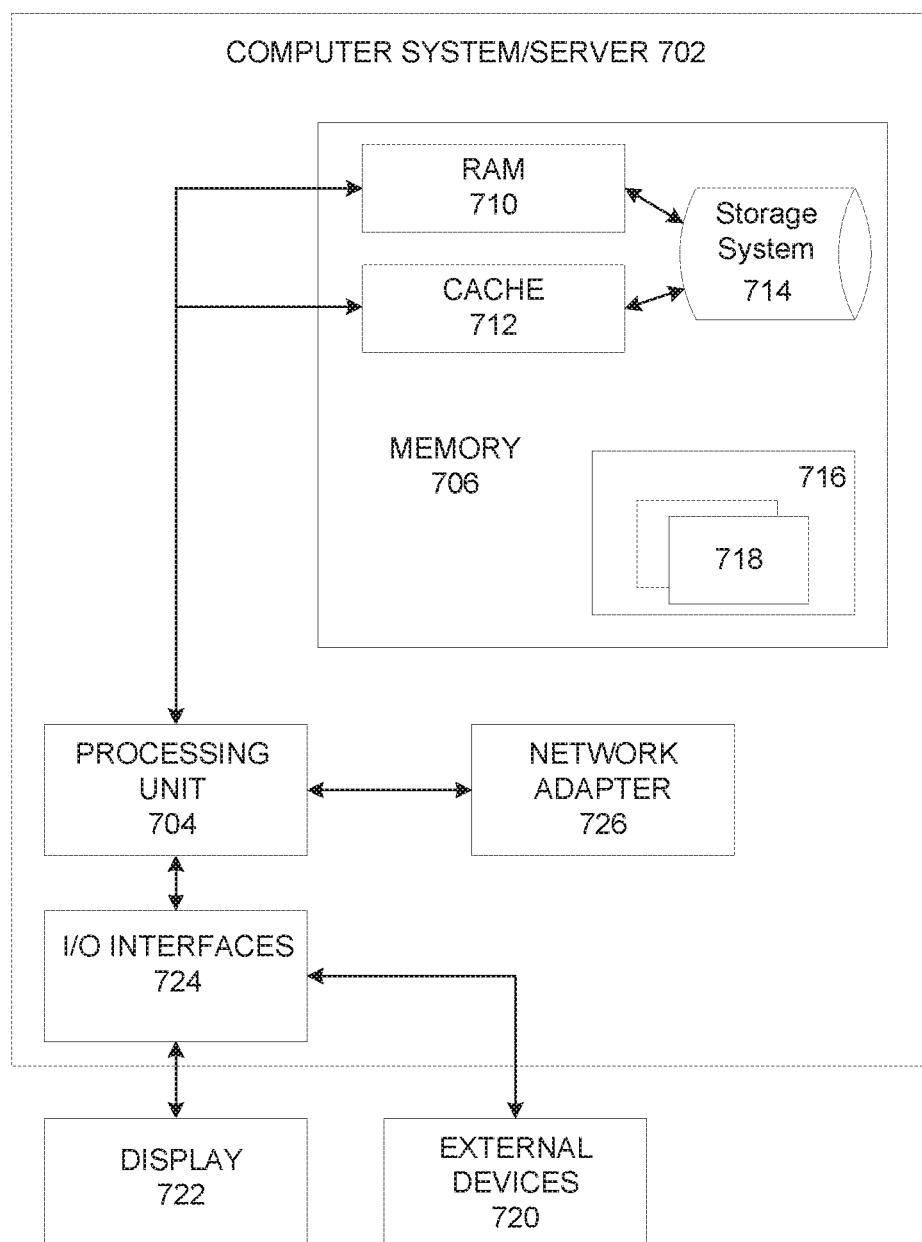

DEVICE COMMUNICATION WITH PUBLIC SAFETY ANSWERING POINT

BACKGROUND

A public safety answering point (PSAP), also referred to as a public safety access point, is a call center staffed to receive emergency calls (e.g., 911, 112, etc.) routed by a telephone network. A PSAP is often equipped with a comprehensive range of components to meet public safety communication goals including telephone systems and controllers, workstations, mapping and radio applications, computer-aided dispatch, and the like. During operation, an emergency call routed to a PSAP may be answered by a trained official referred to as a dispatcher. The PSAP computer often receives information about a physical address of the caller (for a landline) or geographic coordinates of the caller (for a wireless call) and outputs this information on a screen. This information is then used by the dispatcher to dispatch police services, fire services, medical services, and the like. Recently, text-to-911 has been made available in certain jurisdictions. Text-to-911 allows emergency callers to send communications to a PSAP from a mobile device via a text message instead of a traditional phone call.

However, some of the drawbacks of a PSAP is that communications must be initiated by a person (i.e., using a telephone) to place a call to 911 or input a text message in the example of text-to-911. As a result, there is often a delay between when an emergency event takes place, and when the PSAP is informed of such event. Therefore, what is needed is a system which can reduce these delays and provide emergency alerts in real-time.

SUMMARY

One example embodiment may provide an apparatus that includes a network interface configured to receive data and metadata from a device, and a processor configured to one or more of detect that an event has been captured within the device data and a geographic location of the device based on the metadata, convert information about detected event and the geographic location of the device into a telephone communication of the device, and transmit the telephone communication of the device, via a telephone network, to a telephone number of a call station.

Another example embodiment may provide a method that includes one or more of receiving data and metadata from a device, detecting that an event has been captured within the device data and a geographic location of the device based on the metadata, converting information about the detected event and the geographic location into a telephone communication of the device, and transmitting the telephone communication of the device, via a telephone network, to a telephone number of a call station.

A further example embodiment may provide a non-transitory computer readable medium comprising instructions, that when read by a processor, cause the processor to perform one or more of receiving data and metadata from a device, detecting that an event has been captured within the device data and a geographic location of the device based on the metadata, converting information about the detected event and the geographic location into a telephone communication of the device, and transmitting the telephone communication of the device, via a telephone network, to a telephone number of a call station.

BRIEF DESCRIPTION OF THE DRAWINGS

FIG. 3 is a diagram illustrating an example of a PSAP dispatcher user interface according to example embodiments.

FIG. 4A is a diagram illustrating a process of querying hardware devices from a PSAP according to example embodiments.

FIG. 5 is a diagram illustrating a network of devices that consolidate data prior to transmission to the host system according to example embodiments.

FIG. 6B is a diagram illustrating a method of querying a device from a call center according to example embodiments.

FIG. 7 is a diagram illustrating a computer system configured to support one or more of the example embodiments.

DETAILED DESCRIPTION

Figure 1:
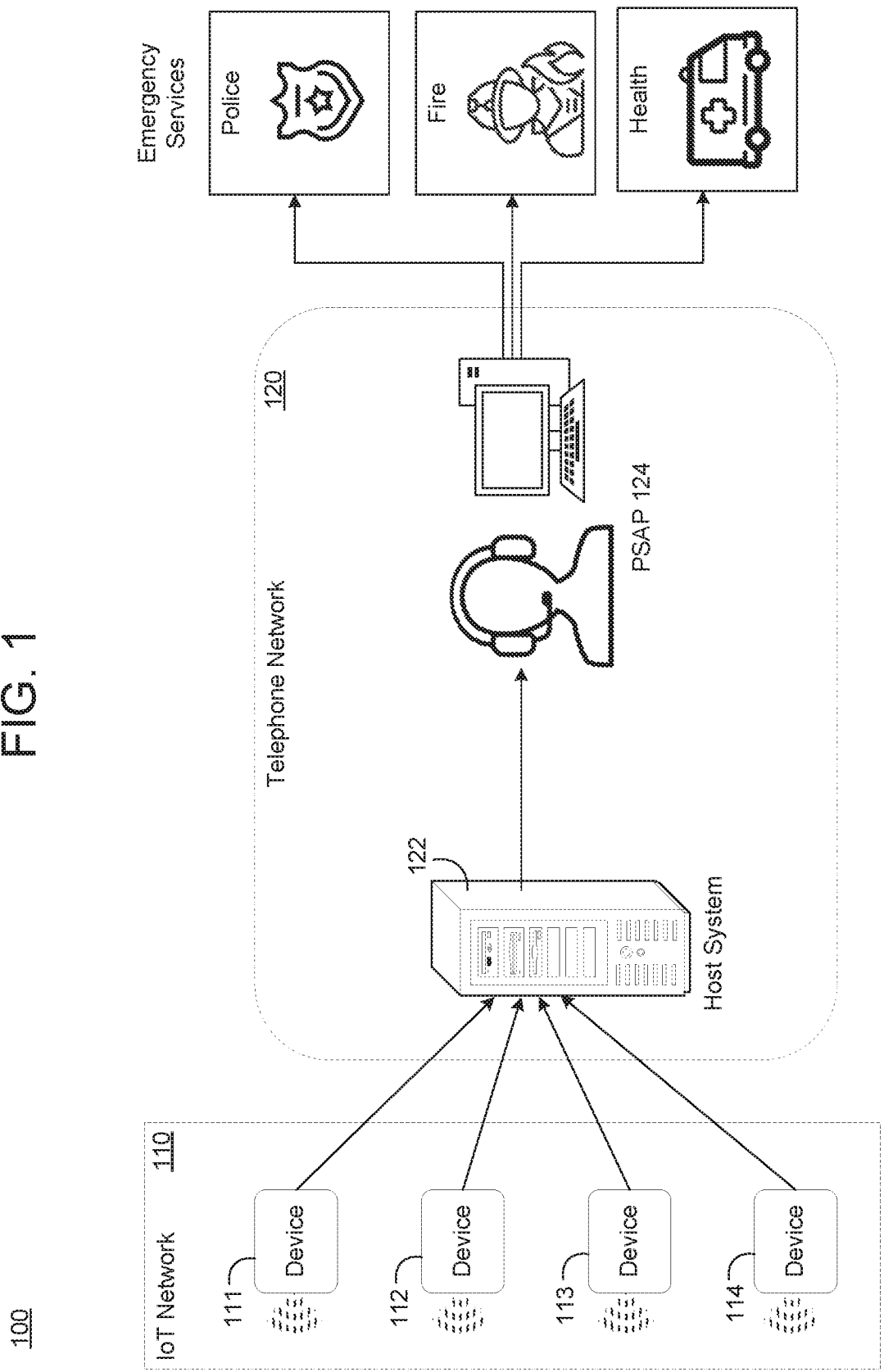
FIG. 1 is a diagram illustrating a communication environment which enables devices and PSAPs to communicate according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed to a system that enables communication between a hardware device and a call station, call center, etc., such as a PSAP, a hospital, a local center, or the like. For example, a device (e.g., a camera, a hardware sensor, an appliance, a machine, etc.) may transmit data captured by the device to a PSAP system. The data may appear on a console/user interface of a PSAP dispatcher in a similar format as if the data is being provided via phone from a human caller. The host system may include software, hardware, etc. that is installed within a telephone network, within the PSAP, within a self-standing system, or the like. The host system may convert a data message/packet from the device into a telephone communication (e.g., text message, phone call, etc.). That is, the host system may transform the device message into a 911 call/message that is suited for communication on existing telephone emergency service networks. Accordingly, the host system enables an Internet of Things (IoT) network to communicate with and trigger emergency services via a telephone network. Here, the data captured by the host system may include data of an event that affects public safety such as a traffic violation, a car accident, a crime, a fire, a disturbance, an item in the roadway, a health issue (e.g., pacemaker alarm, blood pressure monitor alarm, etc.) and the like.

The host system may receive device data via an application programming interface (API) of the device. The device data may include a payload (e.g., images, video, time-series data, audio, etc.) and metadata (e.g., sensor ID, geographic location, timestamp, etc.). The host system may detect that a 911 event is included within the device data. For example, the host system may include logic for identifying traffic accidents, smoke alarms, medical device failure, load bearing issues, and the like. When the host system qualifies the device data as an emergency event, the host system may convert the device data into a telephone communication that can be transmitted over an existing telephony network such as a public switched telephone network (PTSN). For example, the device data, the geographic location of the device, etc., may be formatted and sent to the PSAP via the telephone network. For PSAP systems that cannot receive text messages, the host system may convert the device data into a ghost call (fake call) which also includes the device data such as geographic location, etc., of the sensor which is added to the call in the form of a tag. In addition, the data transmitted to the PSAP from the host system may include one or more URLs which provide network locations of web pages with value added services such as live feeds, recorded data, additional information, etc.

In some embodiments, the host system enables a hardware device to communicate with an emergency call center (PSAP) in a manner that is traditionally reserved for human-dialed calls/texts. The hardware devices capable of communicating with a PSAP include fire alarms, cameras, smoke detectors, carbon monoxide detectors, industrial sensors, pressure sensors, wearable fall sensors, and the like. The host system may receive a data feed from the hardware device. Furthermore, the host system may detect when an event has occurred based on analysis of the data feed. When an event is detected (i.e., an emergency event), the host system may notify an appropriate PSAP. The user interface at the PSAP may receive the alert similar to a 911 call. For example, the call may appear as if it is coming from the sensor itself and may include a geographic location of the sensor, a description of the event, one or more URLs with value added services (video of the event, live video, etc.)

The host system may include logic which can detect events from the device data. For example, the host system may qualify the data from the device as a 911 event. Here, the host system may include logic that can detect when a traffic accident has occurred from within image data of the traffic. As another example, the host system may include logic that can detect when a pacemaker has stopped functioning properly based on time-series data from the pacemaker. As another example, the host system may include logic that can detect when load bearing structure has become unstable based on pressure data sent from one or more sensors on the structure. It should be appreciated that these are just a few examples, and many other examples are possible.

The alert that is transmitted from the host system to the PSAP may include a geographic location of the device. Thus, the PSAP can dispatch the appropriate emergency services immediately. In some embodiments, the alert to the PSAP may include a summary/description of the event which is created by the host system. For example, the host system may include one or more predefined templates thereby enabling the host system to format the data into a structured description. Also, the host system may format that data into a text message format that is compatible with a mobile telephone network (e.g., appropriate size, format, style, and the like).

Accordingly, emergency services can be triggered/initiated by a hardware device rather than through a user interaction with a phone. The system removes the human decision making from a 911 call. For example, the system may trigger/initiate a communication to a PSAP in response to smoke being detected by a smoke alarm, a traffic incident being captured by a camera, a change in pressure, velocity, temperature, etc., detected by an IoT sensor, and the like. The devices may be sensors, etc. that are "always watching" because they can detect data and report the detected data in real-time. Meanwhile, the process of a human manually dialing 911 and describing the situation can take time. Furthermore, people are not always aware of their current location or of all the details of an event (limited view, etc.) In contrast, the example embodiments enable hardware devices to capture data of the event and report not only the occurrence of the event but captured data of the event to emergency services in real-time. For example, an alert may be popped up on a screen of a PSAP dispatcher which is initiated by a device instead of a human. Furthermore, a location of the device may be built into the communications from the device to the host system, and from the host system to the PSAP. Thus, the PSAP dispatcher can immediately identify where emergency services need to be dispatched and which locality to request emergency services from.

In some embodiments, the host system may enable a two-way communication channel between the hardware device and the PSAP. For example, the PSAP may be provided with options for querying a device for additional information about an event. For example, an initial communication from a camera to a PSAP may notify the PSAP of a traffic accident. Shortly thereafter, the PSAP may request additional information from the camera, or another type of sensor near the same location. For example, the PSAP may request additional audio and/or video to enable a PSAP dispatcher to detect whether emergency service personnel have arrived at the scene of the accident. As another example, the PSAP may request additional temperature data from a sensor within a burning building to detect whether it is safe for emergency personnel to enter, etc.

The initial sensor to 911 communication may occur minutes before the emergency personnel arrive on the scene. Accordingly, a PSAP dispatcher may subsequently query sensors at the scene of the event for additional information (e.g., for any changes that may have occurred at the scene since the initial call, etc.) that may be relevant to the emergency personnel that are about to arrive or have already arrived on the scene. This additional information could help ensure the safety of the emergency personnel.

As another example, the host system may enable a sensor or other medical equipment worn by a user to communicate with a call center at a hospital, doctor, or other medical service. For example, a sensor worn by a user such as a blood pressure sensor, a pacemaker, or the like, may detect events. In the example of the pacemaker, the event may be a lack of a heartbeat or a reduced heartbeat. The host system may receive these events and generate a call to the call center of the medical service associated therewith.

Furthermore, in some embodiments, the host system may receive data such as messages or the like from other systems, for example, via external application programming interfaces (APIs), or the like. That is, the host system may receive messages, packets, data streams, etc., from other systems instead of, or in addition to, receiving sensor data from locally attached system. The host system may act as a middleman between another system with sensors that has detected a public safety event and a call center such as a PSAP dispatcher, medical service, local service, or other call center. Here, the host system may transmit messages to the call center from the external system, and to the external system from the call center. The message data from the other system may include a description of the event, sensor data captured by the other system, identification information of the other system and any sensors involved, context of the public safety event, and the like.

FIG. 1 illustrates a communication environment 100 which enables devices 111-114 and a PSAP 124 to communicate according to example embodiments. Referring to FIG. 1, a plurality of devices 111-114 may be disposed within a similar geographic area. In this example, the devices 111-114 are disposed within a communication network 110 that communicate via the Internet. As a non-limiting example, the devices 111-114 may be imaging sensors (cameras), smoke detectors, IoT sensors, carbon monoxide sensors, and the like. In some embodiments, the devices 111-114 may be different types of sensors or have multiple sensor capabilities. The devices 111-114 may transmit data to a host system 122. In this example, the host system 122 may be a gateway, a router, a server, a workstation, or the like, within a telephone network 120. As another example, the host system 122 may be a self-standing server, workstation, device, etc. The host system 122 may include a network interface for communicating with the plurality of devices 111-114 over the Internet.

The host system 122 may also include a telephone interface capable of transmitting communications via a circuit-switched telephone network, a mobile telephone network/channel such as the Global System for Mobile Communications (GSM), code-division multiple access (CDMA), time-division multiple access (TDMA), and the like. Accordingly, the host system 122 may transmit text message (e.g., via GSM, CDMA, TDMA, etc.) to other devices such as a PSAP 124. Meanwhile, the PSAP 124 may include dispatch capabilities for dispatching emergency services (policy, fire, ambulance, etc.)

In this example, the host system 122 can be a communication bridge between the plurality of devices 111-114 in the IoT network 110 and the PSAP 124 in the telephone network 120. According to various embodiments, the host system 122 may receive data packets or messages indicating an event has occurred and that are transmitted from the plurality of devices 111-114 via the Internet. Here, the host system 122 may convert the event data into a format that can be transmitted via the telephone network 120. For example, the host system 122 may convert the sensor data into a text message or even a phone call which can be routed through the telephone network 120 from the host system 122 to the PSAP 124 (call center).

Although not shown in FIG. 1, the telephone network 120 may include many different PSAPs 124 which are available for receiving alerts from the plurality of devices 111-114. In this example, the sensor data transmitted to the host system 122 may include geographical information of the plurality of devices 111-114 such as a physical address, geographic coordinates, etc. In response, the host system 122 may access a file which maps geographic data to PSAPs to identify which PSAP is the nearest PSAP by geography.

In some embodiments, the host system 122 may initially attempt to communicate with the PSAP 124 via a text message. If the PSAP 124 is a legacy PSAP that does not accept text messages, the host system 122 may transmit a voice call with tag data therein which includes sensor metadata (e.g., geographic location, sensor ID, URL of a web page playing the captured vent, etc.) The PSAP 124 may receive the voice call and populate a user interface of the dispatcher with the metadata from the tag including the geographic location and the URL of the captured event.

Figure 2A:
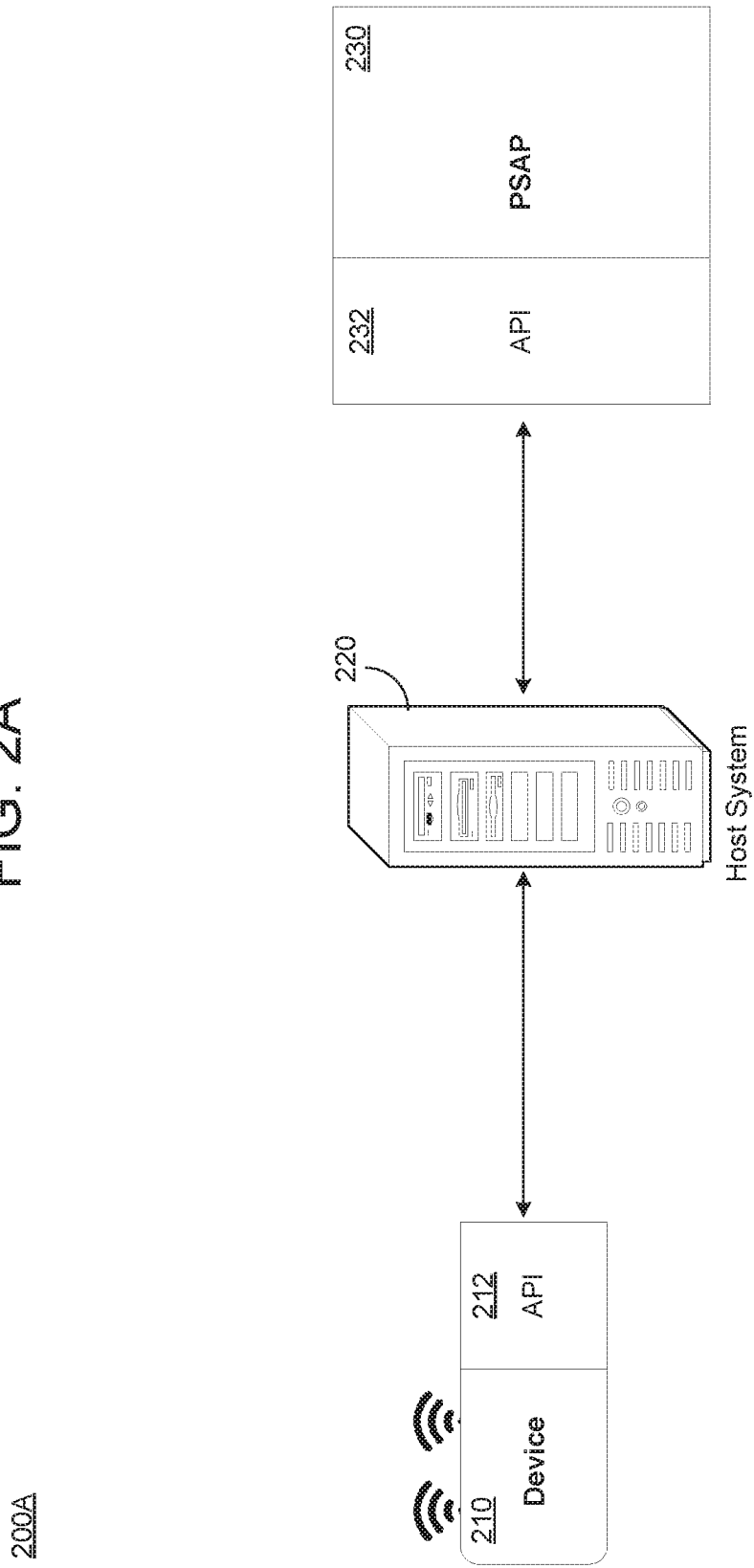
FIG. 2A is a diagram illustrating a host system that can transfer communications between a device and a PSAP according to example embodiments.

FIG. 2A illustrates a host system 220 that can translate communications between a device 210 and a PSAP 230 according to example embodiments. Referring to FIG. 2A, the device 210 may include a sensor such as a temperature sensor, pressure sensor, camera, smoke detector, carbon monoxide detector, or the like. In this example, the device 210 may include a device application programming interface (API) 212 which enables the host system 220 to communicate with the device 210. In some embodiments, the device API 212 may enable the host system 220 to query the device 210 for additional information, for example, images, temperature readings, pressure readings, smoke readings, etc.

In this example, the PSAP 230 also includes an API 232 that enables the host system 220 to transmit 911 calls/texts to the PSAP 230 via telephone network. The PSAP API 232 may require a data format of a PSAP console. Also, the PSAP API 232 may enable the PSAP 230 to transmit queries to the host system 220. For example, the PSAP 230 may transmit a request for additional information from the device 210 to the host system 220. In this example, the host system 220 may provide a layer of abstraction between the device 210 and the PSAP 230 thereby enabling the two systems to communicate.

Figure 2B:
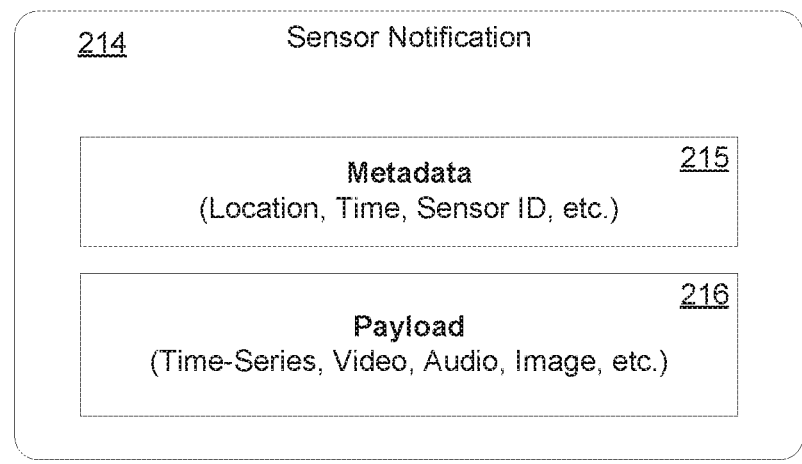
FIG. 2B is a diagram illustrating a message from a sensor to the host system according to example embodiments.

FIG. 2B illustrates a message 214 from the device 210 to the host system 220 according to example embodiments. Referring to FIG. 2B, the message 214 includes a notification from a hardware sensor that has a payload 216 with measured/captured data such as images, video, audio, time-series, etc. The payload 216 may include events therein. In addition, the message 214 may include metadata 215 associated with the device 210. For example, the metadata 215 may include a geographic location of the device 210 (e.g., address, geographic coordinates, etc.), an identifier of the device (name, ID, etc.), a timestamp at which the payload 216 was captured, and the like.

Figure 2C:
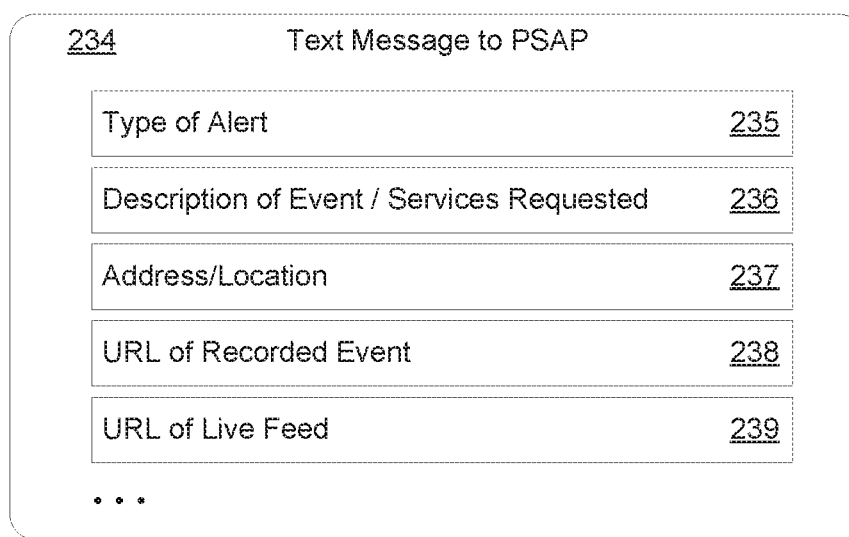
FIG. 2C is a diagram illustrating a communication from the host system to the PSAP according to example embodiments.

According to various embodiments, the host system 220 may receive the message 214 shown in FIG. 2B from the device 210, and generate a message 234 shown in FIG. 2C which is compatible with the PSAP API 232 of the PSAP 230, and which can be transmitted via a telephone network. Referring to FIG. 2C, the message 234 may include a description of the type of alert 235 (e.g., traffic accident, health device failure, etc.) which may be formatted based on a predefined template, a description 236 of the event (e.g., 4 car collision, pacemaker failure, etc.) and services requested (e.g., police, ambulance, fire, etc.) The message 234 may also include a geographic location 237 of the device 210, and one or more URLs for value added services. In this example, the message 234 includes a URL 238 which provides a recording of the event, and a URL 239 which provides a live feed of the device 210.

FIG. 3 illustrates an example of a user interface 300 of a PSAP system according to example embodiments. Referring to FIG. 3, the user interface 300 may include dispatchable call attributes including a telephone number field, caller ID field 302, address field 304, etc. of a traditional PSAP system. Here, the device data is converted into a format that can be output by an existing PSAP user interface 300 such as a computer-aided dispatch (CAD) interface. For example, a sensor identifier may be displayed within a caller ID field 302 that is normally reserved for a name of a person making the call. As another example, a geographic location of the device may be output within the address field 304 which is normally reserved for the address of the person making the call. Here, the host system may transmit messages which populate the user interface 300 with the device data via the API of the PSAP.

In some embodiments, additional data from the device such as images, time-series data, audio, video, etc. may be analyzed by the host system and converted by the host system into a description of the event, a type of event, etc., which is output as a text message via a conversation window 310. For example, the host system may use predefined templates which provide a structure for the text data to be output to the conversation window 310. Furthermore, the host system may output URLs 312 and/or 314 within the conversation window 310 with additional value added services such as a live feed from the device, a recorded feed of the event, and the like. Furthermore, the URLs 312 and 314 may be clicked on by the dispatcher/user causing a window/web browser to be displayed on the PSAP system which opens up a web page of the device data.

Examples of the type of video events that may be detected by the host system and output to the PSAP include, but are not limited to, stopped vehicles, slowed traffic, debris in the roadway, pedestrians in the roadway, poor visibility, wrong-way drivers, and the like. Other data may also be captured such as device speed, vehicle counts, lane occupancy data, congestion data, and the like. The host system can analyze the image data and generate descriptive text of the event that can be output via the text window 310 of the user interface 300 of the PSAP dispatcher. Here, the logic on the host system may detect how many vehicles are involved, whether pedestrians are in the road, whether the emergency personnel has arrived, a type of accident (serious, fatal, non-serious, etc.)

As another example, the device may detect a failed pacemaker, a fire/smoke alarm, a carbon monoxide warning, and the like. Here, the host system may analyze the sensor data from the smoke detector, carbon monoxide detector, pacemaker, etc., and generate a description of the emergency event based on a different predefined event template. Likewise, the generated description can be output via the conversation window 310 of the user interface 300.

Figure 4B:
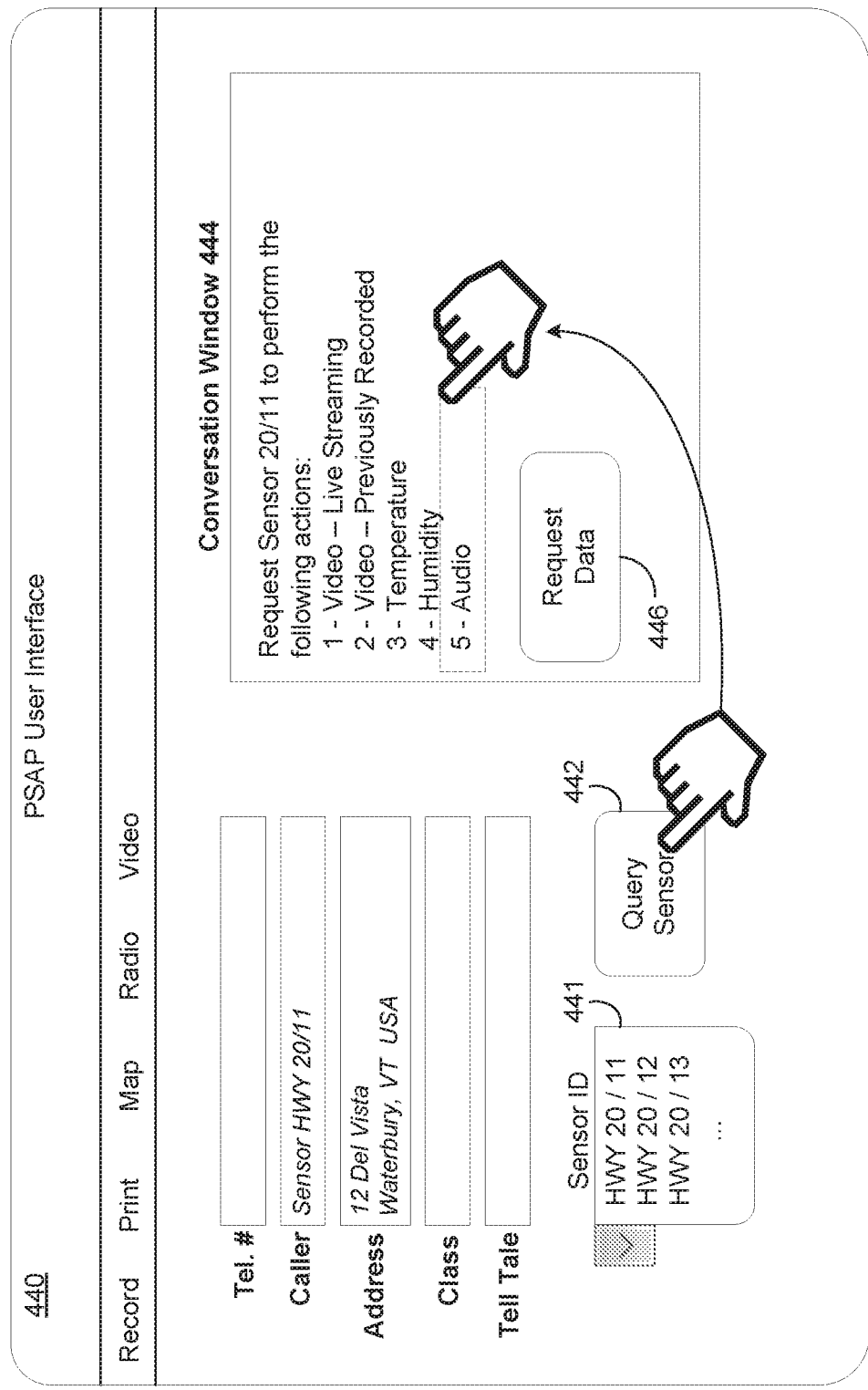
FIG. 4B is a diagram illustrating another example of a PSAP dispatcher user interface according to example embodiments.

FIG. 4A illustrates a process 400 of querying hardware devices 431-434 from a PSAP 410 according to example embodiments, and FIG. 4B illustrates another example of a user interface of a PSAP according to example embodiments. Referring to FIGS. 4A and 4B, a user (such as a PSAP dispatcher) may view the user interface 440 shown in FIG. 4B which includes details of a sensor call placed from a sensor device (e.g., sensor 431) shown in FIG. 4A at the PSAP 410. In this example, the user interface 440 shown in FIG. 4B is the screen of the PSAP 410 shown in FIG. 4A. According to various embodiments, the dispatcher may desire additional information from the sensor 431 and/or additional information from one or more neighboring sensors (e.g., sensor 432, etc.).

Referring to FIG. 4B, the user interface 440 includes a query sensor button 442 which when selected, can populate a conversation window 444 of the user interface 440. In this example, a user may select a sensor based on a sensor ID within a drop-down menu 441 and request that the host system 420 query the sensor for its sensing capabilities. For example, the sensor HWY 20/11 may correspond to sensor 431 shown in FIG. 4A. In response, the host platform 420 may receive the query via a text message and convert the query into a network message that can be transmitted to the sensor 431 via the Internet. For example, the host platform 420 may convert the query into a data format specified by a device API of the sensor 431. In response, the sensor 431 may respond with its sensing capabilities. Here, the sensor 431 may be a device that is equipped with multiple different types of sensors including, for example, video (live and previously recorded), temperature, humidity, audio, and the like.

In response, the sensing capabilities may be output within the conversation window 444 of the user interface 440. In response, the user may use a cursor to select one of the sensing capabilities (or more than one), and submit a request data button 446. The request is then sent to the host platform 420 which converts the request into a format that is understandable by the sensor 431. The sensor 431 may then capture audio for a predetermined amount of time or indefinitely, and continue feeding back the data to the host platform 420. In response, the host platform 420 may convert the received sensor data as described in the examples of FIGS. 1, 2A-2C, 3, and the like, and provide the converted data to the PSAP 410. Thus, a dispatcher may dynamically query a sensor 431 for additional data in response such as in the case when the sensor 431 sends an alert to the PSAP 410.

In some embodiments, the PSAP 410 may request additional data from the same sensor 431 that provided the initial alert. As another example, the PSAP 410 may request additional data from a neighboring sensor 432.

As an example, the dispatcher may be curious as to whether emergency personnel have arrived on the scene of an accident. Accordingly, the dispatcher may receive audio data to determine whether sirens can be heard in the background. As another example, the dispatcher may want to know a current temperature in a burning building after a smoke alarm has sent an alert to the PSAP. Accordingly, the dispatcher can request a current temperature reading from a thermometer. As another example, the dispatcher may want to know whether a suspect is still in the vicinity of a store that is being robbed when a security alarm has triggered an alert to the PSAP. Accordingly, the dispatcher may request video from the store.

FIG. 5 illustrates a network 500 in which devices 511-514 consolidate data prior to transmission to a host system 520 according to example embodiments. Referring to FIG. 5, the sensors 511-514 may include smart sensors or dumb sensors. A dumb sensor may pass raw data to the host system 520 while a smart sensor may have logic that knows "when" to report data to the host system 520 (e.g., upon detecting a change in time-series data, a person/car in the image, a change in smoke, etc.) Both types of data may be provided to the host system 520 which qualifies the data for an emergency event with additional logic.

Furthermore, in the example of FIG. 5, one of the sensors (e.g., sensor 514) may act as a master sensor for the other sensors 511-513. In this example, the lead sensor 514 may receive data from the other sensors 511-513, aggregate the sensor data with its own sensor data, and send the aggregated sensor data to the host system 520. For example, a building may have dozens or even hundreds of sensors (including sensors 511-513) which detect smoke, fire, temperature, pressure, images, etc. The sensors 511-513 may transmit their captured data to the master sensor 514 which aggregates the data and reports the data to the host system 520 on behalf of all the sensors 511-514.

Figure 6A:
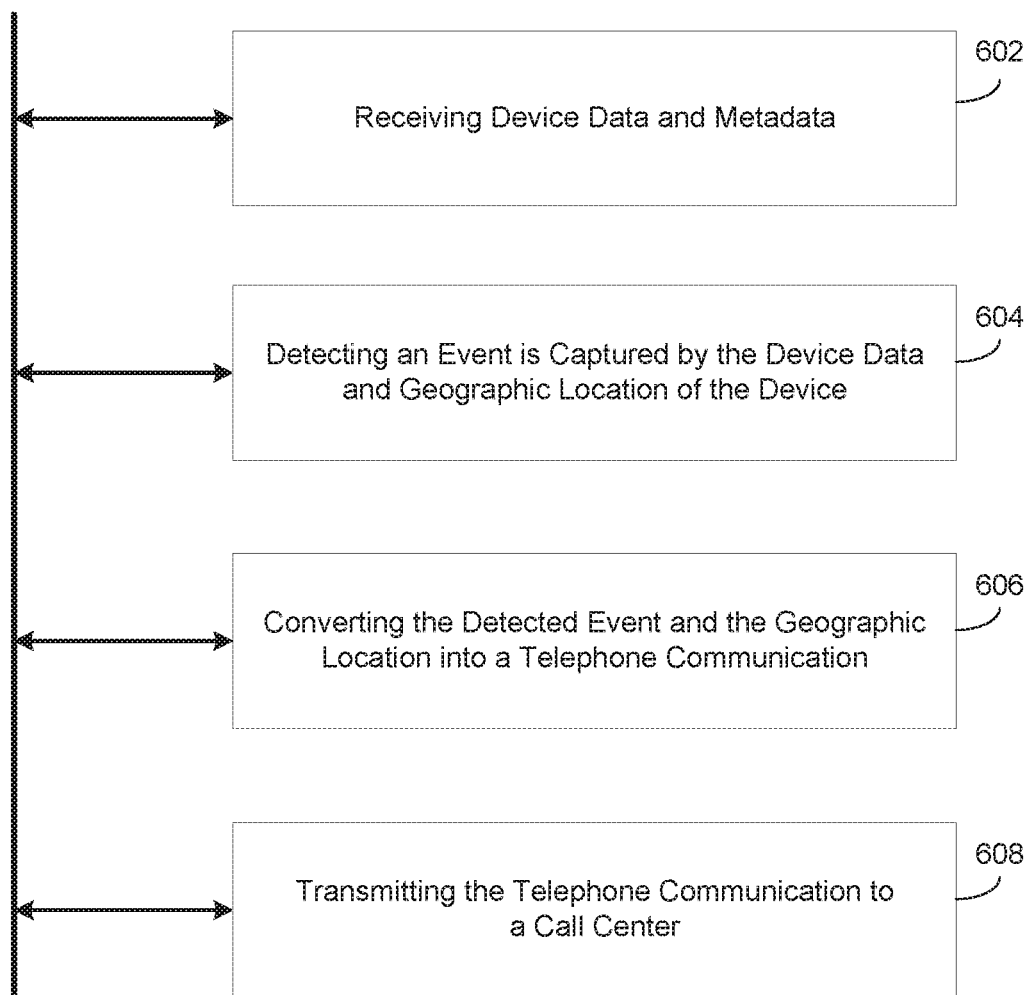
FIG. 6A is a diagram illustrating a method of converting a device message to an emergency communication according to example embodiments.

FIG. 6A illustrates a method 600 of converting a device message to an emergency communication according to example embodiment. For example, the method 600 may be performed by a host system within a public switch telephone network (PSTN), and the like. Referring to FIG. 6A, in 602, the method may include receiving data and metadata from a device. For example, the device may include a camera, an IoT sensor, a smoke alarm, a carbon monoxide detector, or the like. The data may include data captured, measures, sensed, etc., by the device. The metadata may include a geographic location of the device, an identifier of the device, a timestamp, and the like.

In 604, the method may include detecting that an event has been captured within the device data and a geographic location of the device based on the metadata. For example, a host system may include logic therein capable of qualifying the data from the device as an emergency event that requires emergency services. In 606, the method may include converting information about the detected event and the geographic location into a telephone communication of the device. In 608, the method may include transmitting the telephone communication of the device, via a telephone network, to a telephone number of a call center such as public safety answering point (PSAP), a medical service, a local emergency service, or the like.

In some embodiments, the device data may include video captured by a camera, and the detecting comprises detecting an existence of images of a predetermined event within the video. In some embodiments, the device data may include time-series data captured by a hardware sensor, and the detecting comprises detecting a change in the time-series data corresponding to a predetermined event.

In some embodiments, the transmitting may further include transmitting a network address of the device data and instructions which populates a web page of the network address within a web browser of the PSAP. In some embodiments, the network address may automatically redirect the web browser of the PSAP to a web page of one or more of a live device feed and previously recorded device feed.

In some embodiments, the converting may include converting the information about the detected event and the geographic location of the device into a text message, and the transmitting may further include transmitting the text message to the P SAP. In some embodiments, the receiving may include receiving the device data via an application programming interface (API) of the device, and the transmitting may include transmitting the message of the device via an API of the P SAP. In some embodiments, the converting may include converting the information about the detected event and the geographic location of the device into a phone call, and the transmitting comprises transmitting the phone call to the PSAP. In some embodiments, the method may include determining which PSAP to transmit the telephone communication of the device from among a plurality of PSAPs based on the geographic location of the device.

FIG. 6B illustrates a method 610 of querying a device from a call center according to example embodiments. For example, the method 610 may be performed by the host system described herein, that may also perform the method of FIG. 6A. Referring to FIG. 6B, in 612, the method may include receiving, via a telephone network, a telephone communication comprising a query input via a call center. For example, the receiving may include receiving a text message transmitted from a public safety answering point (PSAP) via the telephone network. Here, the text message may be received via an API of the call center.

In 614, the method may include identifying a device associated with the query based on a device identifier that is included within the telephone communication. Furthermore, in 616, the method may include querying the identified device for data via a message transmitted to an application programming interface (API) of the identified device.

In some embodiments, the method may further include receiving sensor data captured by the identified device via the API of the identified device. In this example, the method may further include converting received sensor data captured by the identified device into a second telephone communication, and transmitting the second telephone communication to the call center via the telephone network.

In some embodiments, the querying may include querying the identified device for sensing capabilities of the device, and in response, transmitting a telephone communication to the call center, via the telephone network, with information about the sensing capabilities of the identified device. In some embodiments, the method may further include querying a neighboring device of the identified device for a different type of data via an API of the neighboring device. In some embodiments, the querying may include extracting data attributes from the telephone communication received from the call center, and adding the extracted data attributes to a network message based on the API of the identified device.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be a network server of a larger enterprise network that connects multiple user workstations to the Internet, a private network, or the like. As another example, the computing node 700 may be a cloud platform, a database, an on-premises server, a user device, a combination of devices, and the like.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units (processor) 704, a system memory 706, and a bus that couples various system components including the system memory 706 to the processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724 (which may be referred to herein as an output and/or an input). Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a network interface configured to receive data and metadata from a device; and
   a processor in communication with the network interface, the processor configured to:
      identify an occurrence of an emergency event based on an analysis of the data by the processor;
      identify a geographic location of the device based on the metadata;
      convert information about the identified event and information about the geographic location of the device into a tag;
      generate voice call to a telephone number of call station;
      attach the tag to the voice call; and
      transmit the voice call and the attached tag to the call station.

2. The apparatus of claim 1, wherein the data comprises video captured by a camera, and
   wherein the processor is further configured to:
      identify an image of a predetermined event within the video.

3. The apparatus of claim 1, wherein the data comprises time-series data captured by a sensor, and
   wherein the processor is further configured to:
      identify a change in the time-series data corresponding to a predetermined event.

4. The apparatus of claim 1, wherein the processor is configured to:
   transmit a network address of the data and an instruction to populate a web page of the network address within a web browser of the call station.

5. The apparatus of claim 4, wherein the network address automatically redirects the web browser of the call station to a web page of one or more of a live device feed and previously recorded device feed.

6. The apparatus of claim 1, wherein the network interface is configured to:
   receive the data via an application programming interface (API) of the device, and
   wherein, when the processor is configured to transmit the voice call and the attached tag, the processor is further configured to:

transmit the voice call and the attached tag via an API of the call station.

7. The apparatus of claim 1, wherein the processor is configured to:
identify the call station from a plurality of call stations based on the geographic location of the device.

8. A method comprising:
receiving, by a host system, data and metadata from a device;
identifying, by the host system, an occurrence of an emergency event based on an analysis of the data by the host system;
identifying, by the host system, a geographic location of the device based on the metadata;
converting, by the host system, information about the identified event and information about the geographic location into a tag;
generating, by the host system, voice call to a telephone number of call station;
attaching, by the host system, the tag to the voice call; and
transmitting, by the host system, the voice call and the attached tag to the call station.

9. The method of claim 8, wherein the data comprises video captured by a camera, and
wherein the identifying the occurrence further comprises:
identifying an image of a predetermined event within the video.

10. The method of claim 8, wherein the data comprises time-series data captured by a hardware sensor, and
wherein the identifying the occurrence further comprises:
identifying a change in the time-series data corresponding to a predetermined event.

11. The method of claim 8, wherein the transmitting further comprises:
transmitting a network address of the data and an instruction to populate a web page of the network address within a web browser of the call station.

12. The method of claim 11, wherein the network address automatically redirects the web browser of the call station to a web page of one or more of a live device feed and previously recorded device feed.

13. The method of claim 8, wherein the receiving further comprises:
receiving the data via an application programming interface (API) of the device, and
wherein the transmitting further comprises:
transmitting the voice call and the attached tag message of the device via an API of the call station.

14. The method of claim 8, further comprising:
identifying the call station from a plurality of call stations based on the geographic location of the device.

15. A non-transitory computer-readable medium comprising one or more instructions that when executed by a processor of a host system cause the processor to perform:
receiving data and metadata from a device;
identifying an occurrence of an emergency event based on an analysis of the data by the host system;
identifying a geographic location of the device based on the metadata;
converting information about the identified event and information about the geographic location into a tag;
generating voice call to a telephone number of call station;
attaching the tag to the voice call; and
transmitting the voice call and the attached tag to the call station.

16. The non-transitory computer-readable medium of claim 15, wherein the data comprises time-series data captured by a hardware sensor, and
wherein the identifying the occurrence further comprises:
identifying a change in the time-series data corresponding to a predetermined event.

* * * * *